3,533,662
SUPPORTING WHEEL FOR ENDLESS
TRACK VEHICLE
William R. Richards and Orlen D. Johnson, Roseau,
Minn., assignors, by mesne assignments, to Textron
Inc., Providence, R.I., a corporation of Delaware
Filed Oct. 4, 1968, Ser. No. 765,196
Int. Cl. B62d 55/16
U.S. Cl. 305—27                                    3 Claims

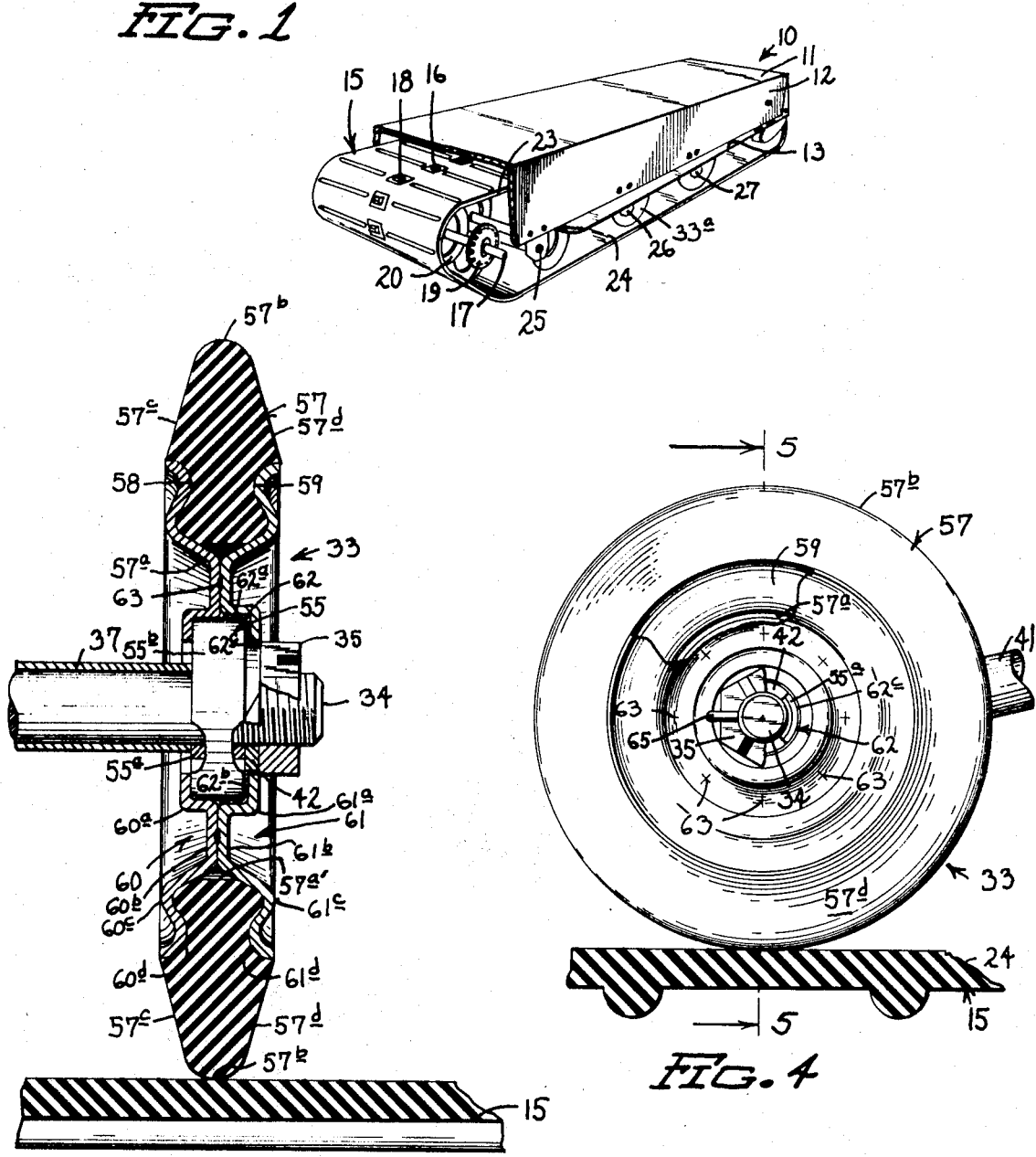

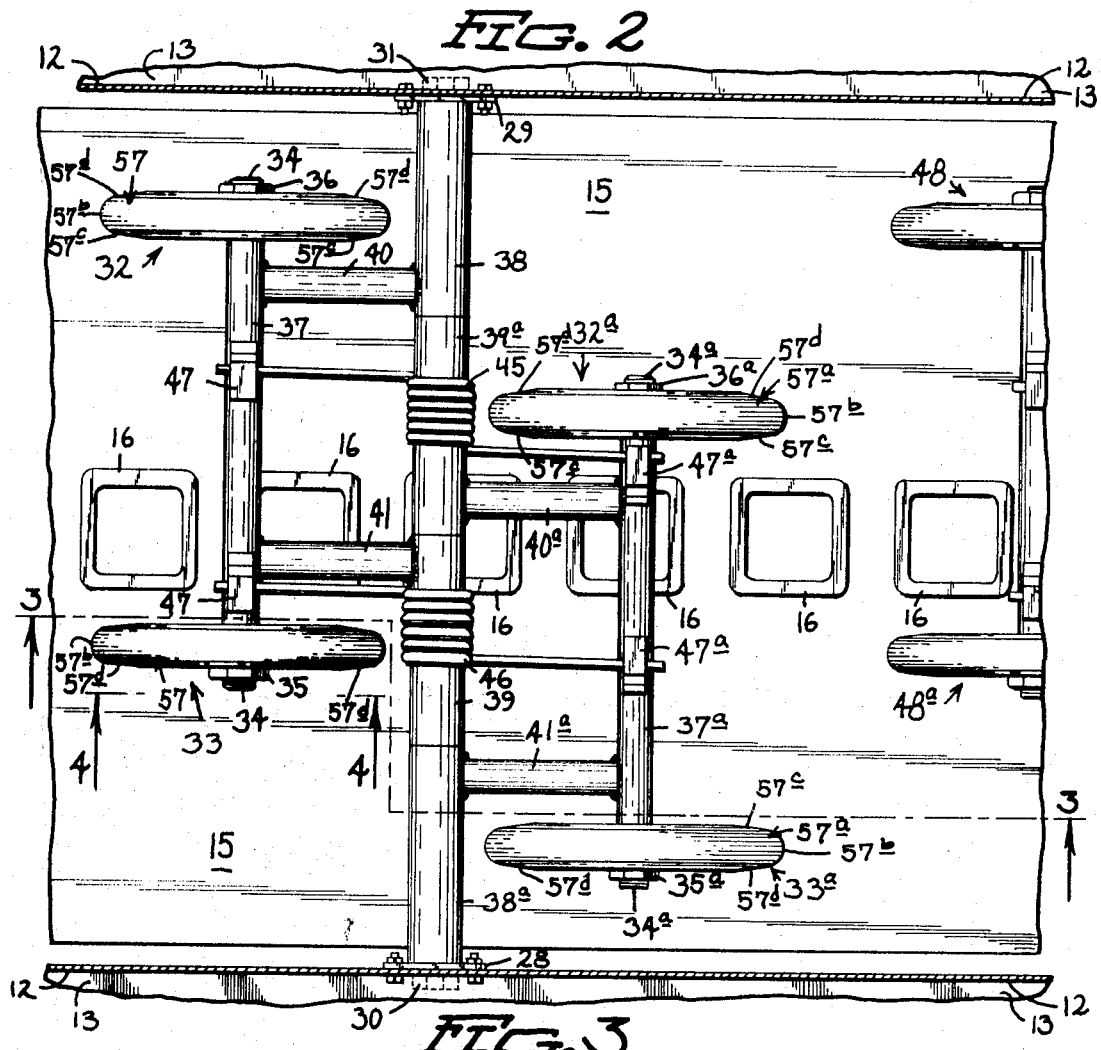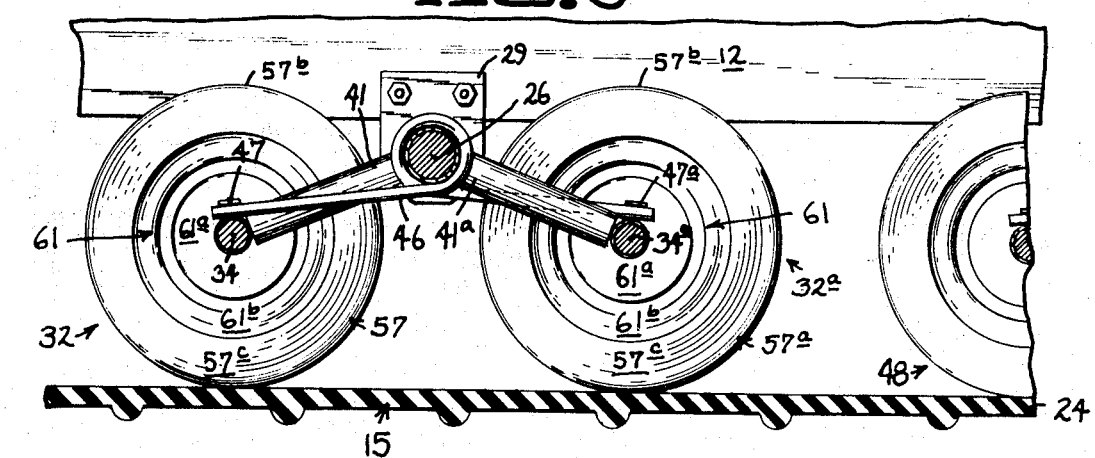

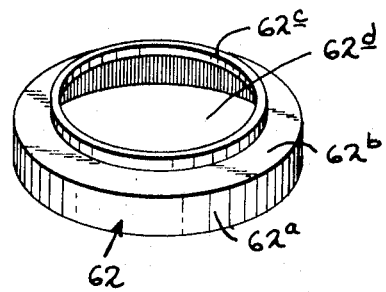
FIG. 7
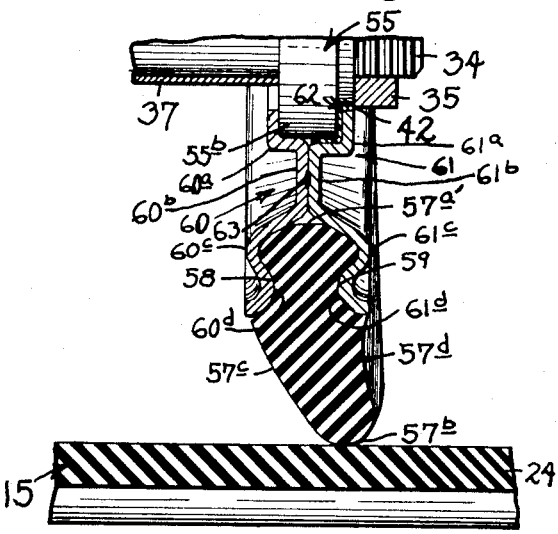
FIG. 6
PRIOR ART FIG. 9
PRIOR ART FIG. 8
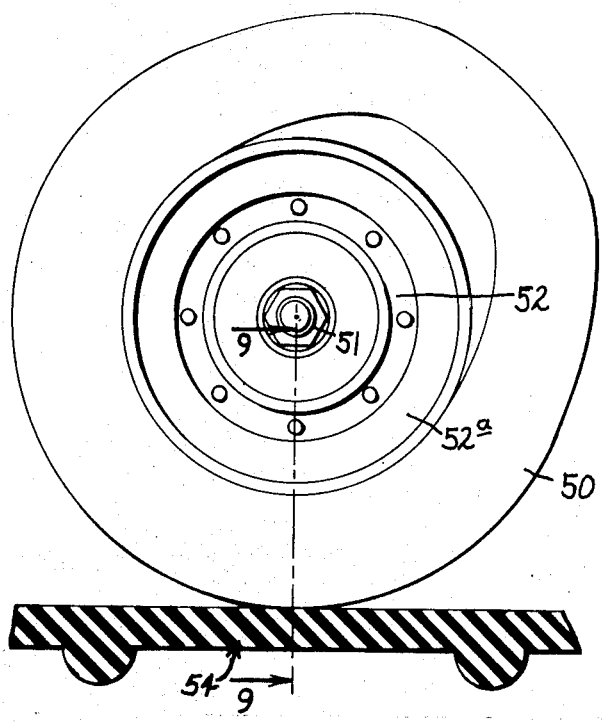
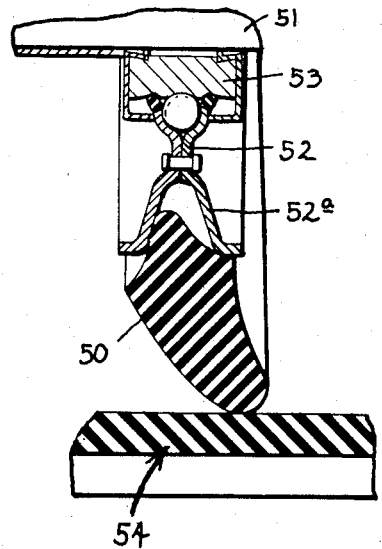
INVENTOR.
William R. Richards
Orlen D. Johnson
BY Merchant & Gould
ATTORNEYS United States Patent Office 3,533,662
Patented Oct. 13, 1970

ABSTRACT OF THE DISCLOSURE

An endless track for a snowmobile is shown. A bogie wheel assembly, secured to the snowmobile frame, includes a plurality of axles each having a pair of bogie wheels rotatably mounted thereon for engagement with the upper surface of the lower run of the track. Each bogie wheel includes a circular bogie tire having an inner face, a track-engaging outer face and a pair of opposite sidewalls. Each sidewall has an annular groove formed therein. An oppositely disposed pair of disk-like flanges are provided to rotatably mount the tire on the axle. The flanges include cup-like central portions that engage a bearing assembly mounted on the axle from opposite sides thereof, and flat connector ring portions extending outwardly therefrom, terminating in upwardly and outwardly flaring spaced rim portions. The rim portions each have an inwardly protruding rib that extends into one of said grooves. The flanges are welded together at their connector ring portions to lock the tire between the rim portions and the bearing assembly between the central portions.

BACKGROUND OF THE INVENTION

Field of the invention

This invention relates generally to motor vehicles having endless track driving means, and more particularly relates to the construction of a wheel for supporting the lower run of the track.

Description of the prior art

In recent years, endless track motor vehicles, commonly called "snowmobiles" have become extremely popular with the general public. Because of their agility and ease of operation, they can be used by one or two persons to drive through roadless areas or to move at relatively high speeds over snow packed or icy roads. Because of the popularity that snowmobile racing has achieved, it is no longer uncommon for a snowmobile to have a top speed of 50 or 60 miles per hour, or more. Especially at these high speeds, the vehicle drive system and track-supporting system are subjected to severe strain and shocks that are not normally encountered at lower speeds.

The typical snowmobile has an endless drive track that is driven at its front end by one or more sprocket wheels that engage suitable openings in the track. The front and rear ends of the track are also normally provided with a pair of idler wheels around which the track rotates. The upper return run of the track normally runs free since it has no load to support. The lower, ground-engaging run of the track, however, must be supported since it carries a large portion of the vehicle's weight and since it must provide sufficient traction for driving purposes. A so-called "bogie" assembly is normally used to support the lower run of the track. One type of prior art bogie assembly is shown in the Hetteen Pat. No. 3,285,676 that issued Nov. 15, 1966. The drawings of the present application show another type of bogie assembly. In these typical bogie assemblies, one or more main support shafts are secured to the snowmobile frame. One or more transversely extending axles are then pivotally secured to each main support shaft. Each axle is spring loaded with respect to the support shaft so that it is biased downwardly toward the lower run of the track. Each axle carries a pair of rotatable bogie wheels that engage the upper surface of the bottom run of the track. Under normal conditions, on flat ground, the lower run of the track will lie flat on the ground and each of the bogie wheels will firmly engage the upper surface thereof. Since each axle, which carries a pair of bogie wheels, is spring loaded, the bogie wheels will yield in response to upwardly directed forces as the snowmobile moves over rough ground. The bogie wheel assembly thus tends to continuously force the lower run of the track downwardly into engagement with the ground. despite its encounter with rough terrain.

The bogie tires themselves are usually made from molded rubber so that they are tough and firm, but yet somewhat flexible. Since the bogie tires are constantly biased into frictional engagement with the upper surface of the lower run of the track, they will rotate along with the track. Since a typical bogie wheel may be approximately 5 to 6 inches in diameter, it can be seen that it will operate at a very high r.p.m. when the vehicle is operating at a high speed. For example, assuming that the vehicle is moving at 60 miles per hour and that a bogie wheel having a 5½ inch diameter is used, the bogie wheel will be rotating at approximately 3900 revolutions per minute. Prior art bogie wheel constructions have not been able to withstand this high speed operation under all conditions.

Prior art bogie wheels have been constructed in much the same manner as V-belt pulleys. That is, the metal mounting rim for the bogie tire has normally had a generally V-shaped cross section, thus forming a V-shaped circular opening into which a rubber tire having the same configuration was placed. The prior art mounting system thus relied upon the firmness of the rubber tire for holding it in the rim. At high speeds, however, the tremendous centrifugal force acting upon the tire would sometimes actually pull it from the rim causing it to roll off the rim if any side thrust was encountered. At low speeds, of course, the prior art tire mounting structure was satisfactory since the tire would merely flex upon the occurrence of a sideways thrust but would not roll off the rim, At high speeds, however, where centrifugal force had already separated the tire from the rim, even a slight amount of vehicle slide would tend to roll the tire off the rim. Such an occurrence during a race would be especially unfortunate since replacing the tire on the rim is a time consuming, difficult job as is the replacing of the entire bogie wheel.

SUMMARY OF THE INVENTION

The present invention provides a new bogie wheel construction that overcomes the problems encountered with prior art construction. In the present invention, the bogie tire is provided with a groove in each sidewall thereof. The bogie tire is rotatably mounted on the axle by means of a flange member having a pair of spaced rim portions that engage the bogie tire. Each rim portion is provided with an inwardly protruding rib that extends into a corresponding groove in the tire sidewall to thereby lock the tire between the rim portions. The flange member is also provided with a cylindrical central portion that surrounds and engages the bearing assembly on the shaft for rotation of the flange member therewith. The flange member comprises two oppositely disposed flanges each having a flat, annular connector ring portion extending between the central portion and the rim portion. The two flat connector ring portions abut each other when the flanges are mounted on the bearing assembly and are spot welded together to lock the tire between the rim portions and to lock the bearing assembly in the central portion. A plastic insert member is mounted between the central portion of one flange and the bearing assembly to prevent electrical current from passing therethrough during the welding operation. The flanges can be quickly manufactured by a simple stamping operation and can be quickly assembled on the axle by an automatic spot welding operation. When the wheel is assembled, the bogie tire cannot pull free from the rim during high speed operation, therefore eliminating the problem of the tire rolling off of the rim.

BRIEF DESCRIPTION OF THE DRAWINGS

FIG. 1 is a view in perspective of a portion of a snowmobile, including a frame and an endless drive track mounted thereon;

FIG. 2 is an enlarged view in horizontal section as seen generally from the line 2—2 of FIG. 1, showing a bogie wheel assembly;

FIG. 3 is a sectional view taken along the irregular line 3—3 of FIG. 2;

FIG. 4 is an elevational view of a single bogie wheel taken generally along line 4—4 of FIG. 2, on an enlarged scale, with parts thereof being broken away;

FIG. 5 is an enlarged sectional view as seen from line 5—5 of FIG. 4;

FIG. 6 is a view similar to that of FIG. 5, portions thereof being broken away, showing the bogie tire in a flexed condition caused by operation stresses;

FIG. 7 is a view in perspective of a plastic insert member used in the present invention;

FIG. 8 is an elevational view of a prior art bogie wheel construction, showing the stresses encountered by the bogie tire under high speed operating conditions; and FIG. 9 is an enlarged sectional view taken generally along line 9—9 of FIG. 8, showing the prior art bogie wheel under conditions similar to those shown in FIG. 6.

DESCRIPTION OF THE PREFERRED EMBODIMENT

Referring now to the drawings, wherein like reference numerals will be used throughout the several views to identify like elements of the invention, there is disclosed in FIG. 1 the rear portion of snowmobile frame 10 having a horizontally extending seating portion 11, a sidewall portion 12 and a foot rest member 13. Mounted beneath and partially within the confines of the inverted, generally U-shaped frame 10 is an endless drive track 15. Preferably, endless drive track 15 is molded in a single piece from rubber, although the particular form of track used is not critical to the present invention. Endless track 15 is provided with a series of sprocket engaging openings 16 formed at spaced intervals along its center. A sprocket wheel (not shown) is mounted on a laterally extending drive shaft 17. The drive sprocket wheel has a plurality of rubber sprocket teeth 18 extending through openings 16 for driving engagement of the track. A metal, toothed sprocket wheel 19 is mounted on the end of shaft 17 for engagement with a drive chain (not shown) extending from the snowmobile transmission. A pair of idler wheels are also mounted on shaft 17 on opposite sides of the drive wheel, one of which is shown and labeled with the numeral 20. The centrally located drive sprocket wheel and the two idler wheels mounted on shaft 17 thus support the front end of drive track 15 for rotation thereabout.

An idler shaft carrying a similar pair of idler wheels is mounted on frame 10 to support the rear end of the drive track 15, but this assembly is not shown on the drawings. All of the idler wheels such as 20 at the front and rear ends of the track are preferably constructed from rubber so as to absorb shocks and reduce wear on the drive track.

For purposes of identification, drive track 15 can be considered to have an upper return run 23 and a lower ground engaging run 24. Lower run 24 provides support for the rear of the vehicle and also engages the ground for driving the vehicle. In order to hold the lower ground engaging run 24 in a relatively flat position and yet provide for upward movements thereof in response to terrain variations encountered, a bogie wheel assembly is positioned between upper run 23 and lower run 24, extending generally between the opposite ends of drive track 15. In the vehicle shown on the drawings, three separate bogie wheel units are utilized, that are mounted on three separate main support shafts 25, 26 and 27.

Since each of the three bogie wheel units is constructed in the same manner, a complete description of one will suffice. FIGS. 2 and 3 disclose the constructional details of the bogie wheel unit mounted on main support shaft 26. The opposite ends of support shaft 26 are secured to frame 10 by means of a pair of brackets 28 and 29 bolted to and extending downwardly from sidewall 12 and the opposite sidewall of frame 10, respectively. The opposite ends of support shaft 26 are tapped and threaded to accommodate bolts 30 and 31 that extend through suitable openings formed in brackets 28 and 29.

A front pair of bogie wheels 32 and 33 are mounted on a front axle 34 having opposite threaded end portions on which are threaded a pair of lock nuts 35 and 36. To provide proper spacing of bogie wheels 32 and 33, a bogie tube 37 is carried by axle 34 between the two wheels. As will be described in more detail hereafter, the inner race of the bearing for each wheel is tightly locked between bogie tube 37 and the associated lock nut 35 or 36. Bogie tube 37 is pivotally mounted with respect to main support shaft 26 by means of a pair of rotatable tubular members 38 and 39 and a pair of rocker tubes 40 and 41. Rocker tube 40 is secured at its opposite ends to bogie tube 37 and tubular member 38. Rocker tube 41 is secured at its opposite ends to bogie tube 37 and tubular member 39. Bogie wheels 32 and 33 are thus pivotable about shaft 26 in a fixed arc determined by the length of rocker tubes 40 and 41.

Mounted on the opposite side of main support shaft 26 is a rear pair of bogie wheels 32a and 33a. Since the mounting structure for bogie wheels 32a and 33a is the same as that previously described for bogie wheels 32 and 33, the same numerals will be applied to the corresponding mounting structure, together with the letter a.

As best shown in FIG. 2, the four bogie wheels of this unit are offset from each other so that they support different areas of the drive track 15. This not only provides more uniform distribution of the load but also causes less wear to any given part of the inner surface of the drive belt 15.

A pair of springs 45 and 46 are provided to bias the two pairs of bogie wheels downwardly into engagement with the upper surface of the lower run of drive track 15. Each of the springs 45 and 46 has a central coiled portion surrounding tubular member 39 or 39a and a pair of spring arms extending in opposite directions therefrom to engage the upper surfaces of bogie tubes 37 and 37a. The ends of the spring arms are held in place by suitable clips such as 47 welded to the upper surface of each bogie tube. As best shown in FIG. 3, each spring such as 46 is designed to bias the two bogie tubes 37 and 37a in a downward direction toward the lower run of track 15. Thus, all four bogie tires of the unit are forced downwardly into firm frictional engagement with the upper surface of the track. At the same time, however, if any bumps are encountered so as to cause an upward movement of track 15, each pair of bogie wheels is free to pivot upwardly about shaft 26 against the bias of the two springs to thereby accommodate the movement of the track. As soon as the obstruction is passed over by the particular portion of the track involved, however, the two springs will force the pairs of bogie wheels down tightly against the lower run immediately. Firm contact with the ground is thus maintained at all times by the track.

FIG. 2 also discloses another pair of bogie wheels 48 and 48a that are associated with main support shaft 27. Bogie wheels 48 and 48a are mounted in the same fashion as heretofore described for bogie wheels 32 and 33, so no further detailed description of their mounting is considered to be necessary.

Since the bogie wheels are quite heavily spring loaded against the upper surface of the lower ground engaging run 24 of track 15, they will be in virtually continuous contact therewith. Further, since very little slippage occurs between the bogie wheels and the track, their speed of revolution will be determined by the speed of the vehicle over the ground. As previously mentioned in the introduction to this application, assuming a vehicle speed of sixty miles per hour and assuming a bogie wheel diameter of 5½ inches, the bogie wheel will rotate at approximately 3900 revolutions per minute. This high speed operation places a heavy strain on the entire unit and on each component part thereof.

The effects of this stress on a prior art bogie wheel construction are shown in FIGS. 8 and 9. A normally circular bogie tire 50 is rotatably mounted on an axle 51 by means of a circular flange member 52 carried by a bearing assembly 53 mounted on axle 51. Flange member 52 includes a generally V-shaped peripheral rim portion 52a into which the correspondingly shaped tire 50 is inserted. As best shown in FIG. 9, both the rim portion 52a and the inner face of tire 50 are generally V-shaped and similar in configuration to a V-belt pulley and V-belt. FIG. 8 discloses, somewhat schematically, what happens to a prior art bogie wheel construction of this kind during high speed vehicle operation. As the r.p.m. of the wheel increases, the centrifugal force action on the wheel also increases so that the bogie tire 50 begins to elongate and begins to pull away from the rim portion 52a as shown. The wheel shown in FIG. 8 is rotating in a counterclockwise direction and moving toward the left. FIG. 9 shows the effect of a high speed turn upon the prior art bogie wheel. When a high speed turn is made, the drive track 54 tends to momentarily maintain its direction while the vehicle frame begins to turn. Since the bogie tire 50 frictionally engages the drive belt 54, it flexes to the side as shown in FIG. 9. If this severe flexing of bogie tire 50 occurs during high speed operation where the tire is already pulled free from the rim by the centrifugal force acting upon it, it is possible for the bogie tire 50 to simply roll off the rim portion 52a. At best, this reduces the support given to that portion of the drive track and, at worst, the rim portion 52a may cause physical damage to the drive track. If a bogie tire is lost during a race, it may well cause the loss of the race.

The features of the present invention, a new bogie wheel construction, are shown in FIGS. 4, 5, 6 and 7. The bogie wheel, designated generally by the number 33, is mounted on threaded axle 34. As shown in FIG. 5, bogie tube 37 is positioned over axle 34. A sealed bearing assembly 55 is mounted on axle 34. Bearing assembly 55 includes an inner race 55a and a cylindrical outer race 55b rotatable with respect thereto. Inner race 55a has a central opening of slightly larger diameter than shaft or axle 34 so that it can be slipped over the end of axle 34 and forced tightly against the end of bogie tube 37, as shown in FIG. 5. Inner race 55a is locked tightly against the end of bogie tube 37, and with respect to axle 34, by means of a lock washer 42 and a threaded lock nut 35. With the inner race 55a thus tightly locked on axle 34, outer race 55b provides a stable carrier for the rotating bogie wheel.

Bogie wheel 33 includes a bogie tire 57 that is circular in shape and is preferably molded from hard but slightly flexible rubber. Bogie tire 57 has an inner face 57a', an outer track engaging face 57b and a pair of oppositely disposed annular sidewalls 57c and 57d connecting faces 57a' and 57b. Each of the annular sidewalls 57c and 57d have a continuous annular groove formed therein identified by the numerals 58 and 59, respectively. In the preferred embodiment shown on the drawings, each groove or depression 58, 59, is a continuous circular groove extending around the entire sidewall.

The flange member for securing the bogie tire 57 to outer race 55b includes an inner flange 60 and an outer flange 61. Each of the flanges 60 and 61 have a cup-like central portion 60a, 61a that encompasses one-half of the outer race 55b around the entire periphery thereof. Each of the flanges 60 and 61 also includes a flat connector ring portion 60b, 61b, that extends outwardly from the periphery of the corresponding central portion 60a, 61a, in a plane perpendicular to axle 34. Extending upwardly and outwardly from the outer periphery of connector ring portions 60b and 61b are rim portions 60c and 61c. Each of the rim portions 60c and 61c is formed to have an inwardly protruding annular rib 60d and 61d. Ribs 60d and 61d are similar in shape to the previously identified grooves 58 and 59 in tire 57.

Mounted between the cup-like central portion 61a of outer flange 61 and outer race 55b is a non-conductive insert member 62. A perspective view of insert member 62 is shown in FIG. 7. Insert member 62 has a cylindrical main portion 62a that fits tightly over the outside half of outer race 55b. Extending inwardly from one edge of circular main portion 62a is an annular sidewall portion 62b that terminates in a circular outwardly extending barrier member 62c defining a circular central opening 62d.

To assemble the bogie wheel 33, insert member 62 is first inserted over what will become the outer one-half of bearing assembly 55. Inner and outer flanges 60 and 61 are then inserted over bearing assembly 55 from opposite directions. The central portion 60a of inner flange 60 is designed to fit snugly over outer race 55b as shown in FIG. 5, and is provided with a central opening to accommodate its eventual insertion over axle 34 and bogie tube 37. The central portion 61a of outer flange 61 is slightly larger than outer race 55b in order to accommodate insert member 62 therebetween. The outside wall of cup-like central portion 61a fits flush against sidewall portion 62b of insert member 62, and terminates in a circular opening into which barrier member 62c extends. As shown in FIG. 5, the central opening 62d of insert member 62 is of the same diameter as lock washer 42 so that it fits snugly around the lock washer. One of the functions of insert member 62 is therefore, to prevent the entrance of dirt or other foreign material into the region adjacent bearing assembly 55 during operation of the vehicle.

When the inner and outer flanges 60 and 61 are inserted over outer race 55b, their connector ring portions 60b and 61b fit flush against each other in a plane that bisects the wheel. The connector ring portions 60b and 61b are then spot welded together as at 63 to lock outer race 55b in the cylindrical central portion of the flange member and to lock bogie tire 57 between rim portions 60c and 61c. The rim portions 60c and 61c tightly engage the inner face 57a' and the sidewalls 57c and 57d of tire 57. The inwardly protruding ribs 60d and 61d extend into annular grooves 58 and 59 respectively to lock the tire 57 between the rim portions. After the entire bogie wheel 33 has been assembled in this manner, it is slipped over the end of axle 34 against bogie tube 37. Lock washer 42 is then placed against the inner race 55a and tightened down by means of nut 35. If desired, a cotter pin 65 can be used to hold nut 35 in place.

With this construction, it is impossible for tire 57 to expand outwardly with respect to the flange member as a result of centrifugal forces. The innermost sidewall portions of tire 57 extend behind the protruding ribs 58 and 59 to securely lock the tire in place. The rim portions 60c and 61c are also shaped to provide support to the bogie tire during operation and during skids or slides as shown in FIG. 6. Each rim portion 60c and 61c flares outwardly from the corresponding rib 58 or 59 and terminates in a peripheral edge that lies generally in the same plane as the widest part of the sidewall portion 57c, 57d that extends beyond the corresponding rim portion. These outer sidewall portions of tire 57 converge from this widest point adjacent the peripheral edge of the rim portions to a more narrow, rounded track-engaging face 57b. This configuration of tire 57 permits sufficient frictional engagement between tire 57 and drive track 15, and at the same time permits the tire to flex in response to relative lateral movements of the tire and drive track. Again, however, the locking arrangement described herein prevents the tire from expanding out of the rim when under the influence of heavy centrifugal forces and also prevents the tire from rolling out of the rim during skids or slides.

It should be noted that the primary purpose of insert member 62 is to facilitate the manufacture of the flange member. During the spot welding operation, it is important that all of the current pass directly through the adjoining connector ring portions 60b and 61b so that a proper weld connection is achieved. Insert member 62 therefore provides a non-conductive barrier between outer flange 61 and outer race 55b to prevent the passage of current therethrough during the welding operation. As previously mentioned, insert member 62 also helps to prevent dirt or other foreign material from entering the area near the bearing assembly during operation of the vehicle. Even if insert member 62 should deteriorate to some extent during use, it will not affect performance of the bogie wheel since central portion 60a will always remain in firm contact with outer race 55b.

The present invention therefore, provides a new and improved bogie wheel construction that will prevent the bogie tire from breaking loose from the rim during all conditions of operation. The present invention is also adaptable for use in wheels constructed for other purposes. The scope of the invention is defined in the appended claims.

What is claimed is:

1. In a snowmobile track engaging wheel construction including a bearing assembly adapted to be mounted on an axle, a flange member mounted on said bearing assembly and a tire mounted on said flange member, the improvement comprising:
   (a) said bearing having an outer race rotatable with respect to said axle;
   (b) said flange member comprising an inner flange and an outer flange mounted on opposite sides of said bearing assembly, said flanges each having a central portion that engages said outer race around the periphery thereof;
   (c) said inner and outer flanges each having a flat connector ring portion extending outwardly from the periphery of said central portion and a rim portion extending therefrom to engage said tire;
   (d) a non-conductive insert member mounted between said central portion of one of said flanges and said outer race; and
   (e) said flat connector ring portions of said flanges abutting each other and being welded together, said insert member preventing current flow through said bearing assembly during the welding operation.

2. In a snowmobile having a frame, having an endless track with a lower ground engaging run and an upper return run, and having a track supporting assembly secured to said frame and positioned between said upper run and said lower run, with a plurality of wheels rotatably mounted thereon for engagement with the upper surface of said lower ground engaging run of said track, to thereby yieldingly support said lower run; the improvement being an improved wheel construction comprising:
   (a) a sealed bearing assembly having an inner race and a cylindrical outer race rotatable with respect thereto;
   (b) a circular, molded rubber tire having an inner face, an outer track-engaging face and a pair of oppositely disposed side walls connecting said faces, each of said annular side walls having a continuous annular groove formed therein; and
   (c) a flange member including an inner flange and an outer flange mounted on opposite sides of said bearing assembly, said flanges each having a cuplike central portion that encompasses one-half of said outer race of said bearing assembly around the entire periphery thereof, at least one of said central portions tightly engaging said outer race, an annular, flat connector ring portion extending outwardly from the periphery of said central portion in a plane perpendicular to the axis of rotation of said tire, with the flat connector ring portion of each flange abutting and being connected to said corresponding flat connector ring portion of the other flange, and a rim portion extending upwardly and outwardly from the outer periphery of each said connector ring portion, said rim portions extending on opposite sides of and tightly engaging the inner face and side walls of said tire, each of said rim portions being formed to have an inwardly protruding annular rib having a smooth face that fits into one of said grooves in said tire side walls to lock said tire between said rim portions, said inner side wall portions extending behind said ribs to prevent said tire from expanding outwardly from between said rim portions, each said rim portion smoothly flaring outwardly from said rib and terminating in a peripheral edge that lies generally in the same plane as the widest part of said side wall.

3. The apparatus of claim 2 including a non-conductive insert member mounted between said cup-like central portion of one of said flanges and said outer race of said bearing assembly, the other cup-like portion tightly engaging said outer race; and said flat connector ring portions of said flanges being welded together, said insert member preventing current flow through said bearing assembly during the welding operation.

References Cited

UNITED STATES PATENTS

| | | | |
|---|---|---|---|
| 623,034 | 4/1899 | Reid | 152—382 X |
| 1,595,182 | 8/1926 | Fravel. | |
| 2,644,575 | 7/1953 | Mercier | 74—230.8 X |
| 2,848,278 | 8/1958 | Todd. | |
| 3,309,150 | 3/1967 | Marier | 180—5 X |
| 3,415,500 | 12/1968 | Pethis | 308—184 |

FOREIGN PATENTS

| | | |
|---|---|---|
| 605,410 | 7/1948 | Great Britain. |

RICHARD J. JOHNSON, Primary Examiner

U.S. Cl. X.R.

74—230.7; 152—379; 219—92; 301—63; 308—191